T. TURNER.
LUBRICATING ARRANGEMENT FOR PNEUMATIC ROCK DRILLS.
APPLICATION FILED APR. 4, 1918.
1,324,327.
Patented Dec. 9, 1919.
2 SHEETS—SHEET 1.
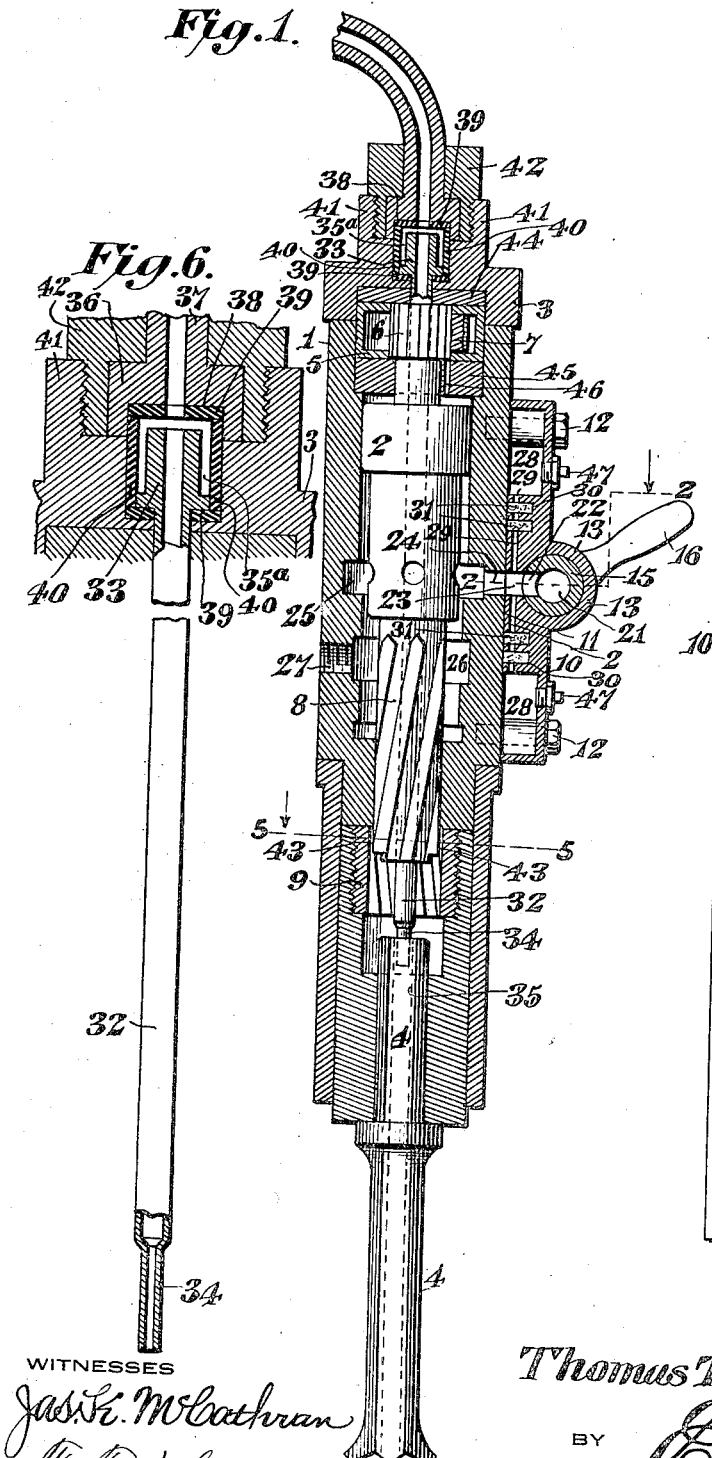
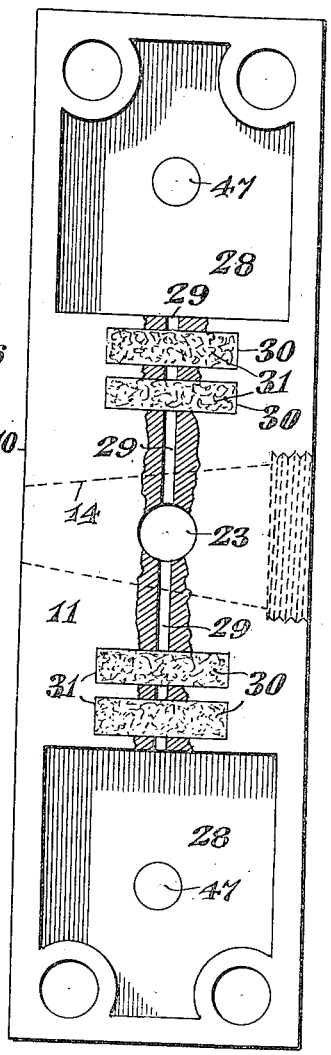
WITNESSES
Thomas Turner, INVENTOR

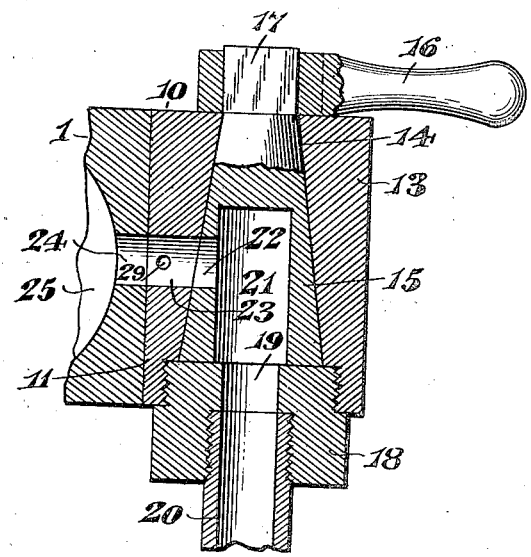
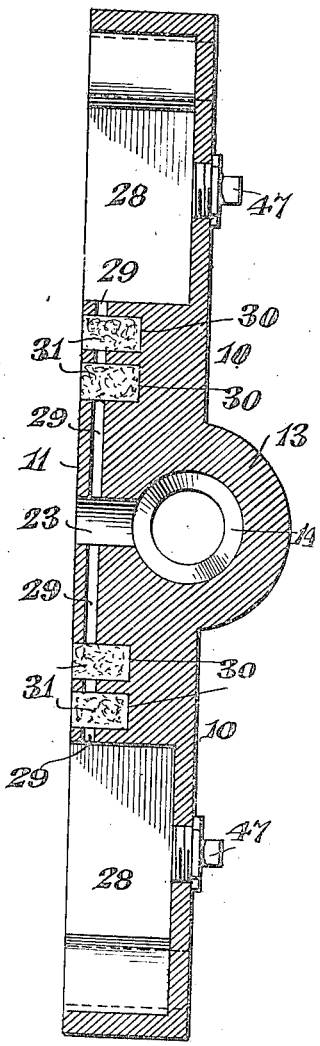
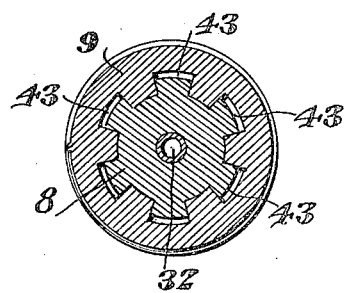

UNITED STATES PATENT OFFICE.

THOMAS TURNER, OF OTTUMWA, IOWA, ASSIGNOR TO HARDSOCG WONDER DRILL COMPANY, OF OTTUMWA, IOWA.

LUBRICATING ARRANGEMENT FOR PNEUMATIC ROCK-DRILLS.

1,324,327.

Specification of Letters Patent.

Patented Dec. 9, 1919.

Application filed April 4, 1918. Serial No. 226,755.

*To all whom it may concern:*

Be it known that I, THOMAS TURNER, a citizen of the United States, residing at Ottumwa, in the county of Wapello and State of Iowa, have invented a new and useful Lubricating Arrangement for Pneumatic Rock-Drills, of which the following is a specification.

This invention has reference to lubricating arrangements for pneumatic rock drills of the valveless type and also includes means for cleaning out the bore.

The object of the invention in so far as the lubricating part thereof is concerned, is to provide for the constant feed of a lubricant in minute but sufficient quantities to the various moving parts by the action of the air under pressure employed as a driving means for the drill hammer. With respect to the cleaning out of the bore, the invention has to do with a packing arrangement for a pipe delivering water under pressure, and with means utilizing the exhaust air in part for the same purpose in conjunction with the water.

The arrangement for lubrication provides a reservoir for lubricant, with means for presenting the lubricant at the air channel leading from the air throttle valve to the interior of the drill, the lubricant flowing through retarding means which prevents back pressure from stopping the flow of lubricant and which causes the air under pressure to act somewhat on the injector principle, thoroughly atomizing the lubricant so that the latter is carried to all moving parts by the air streams with the lubricant in sufficient quantity to provide proper lubrication.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Figure 1 is a longitudinal diametric section of the drill structure with the lubricating arrangement applied and also provided with means for utilizing both exhaust air and water for cleaning out the bore.

Fig. 2 is a section on the line 2—2 of Fig. 1 but drawn on somewhat larger scale.

Fig. 3 is a section of the lubricant reservoir with the valve casing forming a part thereof and drawn on a larger scale than in Fig. 1.

Fig. 4 is a rear face view of the structure shown in Fig. 3, parts being shown in section.

Fig. 5 is a section on the line 5—5 of Fig. 1, drawn on a larger scale and including only the rifle stem and nut therefor together with the water conveying tube.

Fig. 6 is a longitudinal section, with some parts in elevation, of the water conveying tube and showing the manner of packing this tube at its upper end, the drawing being on a larger scale than that of Fig. 1.

Referring to the drawings, there is shown a casing 1 constituting a hammer cylinder and inclosing a reciprocatory hammer or piston 2, neither the casing nor the hammer forming part of the invention and therefore needing no particular description. The casing 1 is provided with a head or cap 3 at one end and at the other end carries a drill bit 4, both of which may be of approved construction and neither of which constitutes a part of the invention. The end of the casing or hammer cylinder provided with the cap 3 houses a ratchet container 5 in which is lodged a ratchet 6 and ratchet pawl 7 which may also be of common construction.

That end of the hammer piston 2 remote from the ratchet carries an axial rifle extension 8 traveling in a rifle nut 9 whereby reciprocating movements of the hammer piston produces progressive rotative movements thereof as is the common practice in drills of the type to which the invention relates, the rotative movements being participated in by the drill bit 4, but the particular mechanism for this purpose, being well known, is not illustrated in the drawings.

In drills of the present type, air is fed under pressure into the hammer cylinder and automatically causes the rapid reciprocation of the hammer, which in turn delivers blows to the drill bit with the latter in engagement with the material to be drilled, whereby there is produced a bore in such material.

Applied to one side of the casing or cylinder 1 is an elongated block 10 which may have a flat face 11 fitted snugly against the corresponding face of the hammer cylinder and held thereto by screws 12, the arrangement being such that the fitting is sufficiently tight to prevent leakage.

At an intermediate point of the length of the block 10 there is formed an outstanding valve casing 13, which in the particular arrangement shown, extends across the block 10. The valve casing 13 is provided with a taper bore 14 in which is fitted a taper throttle valve 15 having a handle 16 applied to an axial projection 17 at one end, while the other end, which is the wider end of the taper valve, is held in the bore 14 by a screw plug 18 through which there is a central bore 19 counterbored at the outer end to receive an air pipe 20 which is assumed to be connected to a suitable source of air under pressure. Within the taper valve body 15 there is formed an axial chamber 21 having a side port 22 movable into and out of coincidence with another port 23 opening through the face 11 of the block 10.

Communicating with the port 23 is a passage 24 in the hammer cylinder 1, in turn opening into a chamber 25 distributing the air under pressure to the hammer piston 2. Within the hammer cylinder 1 is another chamber 26 from which leads an exhaust port 27.

Within the block 10, near opposite ends thereof, are lubricant chambers or walls 28 each communicating through a passage 29 of small diameter with the passage 23 in the block 10. The continuity of each passage 29 is broken by pockets 30 containing fibrous material 31, for instance, as well packing, or felt, although by no means confined to such particular material.

Extending axially through the hammer piston 2 and rifle extension 8 is a tube 32 provided at one end with a head 33 and at the other end with a nozzle 34, the latter entering an axial passage 35 through the drill bit 4. The head 33 of the tube 32 is seated in a cavity 35ª in the cylinder head 3, and extends into a swivel head 36 at the corresponding end of a swivel connection 37 assumed to be attached to a source of water under pressure. The swivel head 36 has a cavity 38 therein matching the cavity 35ª, and the matching cavities having gaskets 39 at their opposite ends and also contain a bushing 40. The washers or gaskets 39 and the bushing 40 may be of rubber or other suitable water proof packing. The head 3 is provided with an internally threaded neck 41 to which there is applied a screw plug 42 holding the swivel head 36 in place, and at the same time compressing the packing made up of the washers 39 and bushing 40 so that the swivel may turn, as is customary, but leakage between the swivel and tube 32 is prevented.

The rifle extension 8 does not bottom in the nut 9 so that between the ribs of the rifle extension and the rifle threads of the nut 9 are shallow spaces 43.

The ratchet container 5 is lodged between friction rings 44 and 45 respectively, and through the ring 45 is a passage 46 leading from the air space within the hammer cylinder at the corresponding end of the hammer piston into the ratchet container, for a purpose which will hereinafter appear.

Assuming that the lubricant receptacles 28 are properly supplied, screw plugs 47 being provided in each receptacle for filling it, and if the valve 15 be open, the air under pressure will cause the reciprocation of the hammer piston and the operation of the drill bit in the usual manner. Lubricant, of the proper fluidity, separates through the packing 31 and flows through the passage 29 to the passage 23, being then in the path of the air streams under pressure entering the hammer cylinder 1. Such air streams engage the lubricant presented at the mouths of the passages 29, and pick such lubricant up and atomize it because of the speed of the air streams and the fact that these air streams cut across the path of flow of the lubricant from the passages 29. The result is that the lubricant is carried in suspension by the air streams, and is directed about the hammer piston and into the space between the latter and the friction ring 45 and ultimately through the passage 46 to and into the ratchet container 5. When the hammer piston moves toward the drill bit until cut off from the supply of live air, the piston is in position to exhaust into the chamber 26. The exhaust also takes place between the rifle extension 8 and the nut 9 by way of the narrow passages 43; wherefore, lubricant is carried by this exhaust flowing between the rifle extension or stem 8 and the nut 9 and to the bit 4, thoroughly lubricating the various moving parts. Moreover, the exhaust air, still under some pressure, finds escape between the nozzle 34 and the bore 35 of the drill bit and into the bore produced by the drill bit, such air mixing with the water stream supplied by the water tube 32 and aiding in the discharge of borings contained in the drill bore in the rock or other material being operated upon. In this way the air acts in the customary manner, and furthermore, serves as a vehicle for lubricant carrying it to all moving parts needing lubrication and keeping them thoroughly lubricated. Moreover, the exhaust air is in part utilized to assist the water delivered through the tube 32 in clearing the bore produced by the drill.

The fibrous material 31 not only prevents unnecessary flow of lubricant when the drill is not working but retards the flow when the drill is working, since the suction or injector action of the air streams would otherwise quickly exhaust the supply of lubricant. The series of receptacles for fibrous material is preferred to a single one in each passage 29.

The pockets or cavities 30 and the receptacles 28 all open through what constitutes the rear face 11 of the block 10 so as to be readily reached for cleansing and for the renewal of the packing when necessary.

By reason of the provision of two lubricating chambers, one on each side of the air passage, the invention functions perfectly under all conditions of service. Regardless of the position of the drill, the lubricant is delivered at exactly the same point in the air passage, where it is speedily entrained by the stream of air.

What is claimed is:—

1. A pneumatic drill provided with a lubricant holder, with an air valve intermediate of its length, and a port or air passage leading from the valve to the interior of the drill, the lubricant holder having lubricant receptacles on opposite sides of the air valve, ducts leading from the lubricant receptacles into said passage, and means in the lubricant ducts for retarding the flow of lubricant from the lubricant receptacles to the air duct.

2. In a lubricator, a passage for fluids, lubricant chambers disposed near each end of the lubricator on opposite sides of said passage, ducts connecting each chamber with the passage, a plurality of pockets interrupting said ducts, and means housed by said pockets to retard the flow of the lubricant.

3. In a lubricator, a fluid passageway, lubricant chambers disposed near each end of the lubricator on opposite sides of said passageway, ducts joining each chamber with the passageway, said ducts lying at right angles thereto and in alinement with each other, a plurality of pockets interrupting each duct and lying transversely thereof, said pockets being spaced from each other and from the chambers, and flow retarding means inclosed within each pocket.

4. In a lubricator, a passage for fluids, lubricant chambers disposed on either side of the passage at the ends of the lubricator body, a duct connecting both chambers with the passage, said ducts lying in the same line, a plurality of pockets interrupting each duct and lying transversely thereof, each pocket being of a large diameter compared to the ducts, flow retarding material completely filling each pocket, the pockets of each duct being separated from the chamber and from each other by a short distance and from the passage by a relatively long distance.

5. Lubricating means for a pneumatic drill, comprising a block, an air valve, and an air duct leading therefrom for directing operating air to the interior of the pneumatic drill, said block having lubricant holding means therein communicating with the air duct, and enlargements in the lubricant conveying means with means therein for retarding the flow of the lubricant to the air duct.

6. Means for supplying lubricant to a pneumatic drill, comprising a block for attachment to the drill body, said block having a lubricant receptacle open on the face toward the drill body, an air valve mounted in the block and provided with an air duct open on the face toward the drill body for delivering operating air streams into the pneumatic drill, a duct leading from the lubricant receptacle to the air duct, and means for holding retarding material interposed in the lubricant duct and also open on that face of the block toward the drill body.

7. Means for supplying lubricant to a pneumatic drill, comprising a block for attachment to the drill body, said block having a lubricant receptacle open on the face toward the drill body, an air valve mounted in the block and provided with an air duct open on the face toward the drill body for delivering operating air streams into the pneumatic drill, a duct leading from the lubricant receptacle to the air duct, said lubricant duct having a plurality of enlargements, and fibrous material in the enlargements and acting as retarding means for the flow of lubricant.

8. Means for supplying lubricant to a pneumatic drill, comprising a block for attachment to the drill body, said block having a lubricant receptacle open on the face toward the drill body, an air valve mounted in the block and provided with an air duct open on the face toward the drill body for delivering operating air streams into the pneumatic drill, a duct leading from the lubricant receptacle to the air duct, said lubricant duct having a plurality of enlargements, and fibrous material in the enlargements and acting as retarding means for the flow of lubricant, said enlargements opening through the face of the block toward the body of the pneumatic drill.

9. Means for supplying lubricant to a pneumatic drill, comprising a block for attachment to the drill body, said block having a lubricant receptacle open on the face toward the drill body, an air valve mounted in the block and provided with an air duct open on the face toward the drill body for delivering operating air streams into the pneumatic drill, a duct leading from the lubricant receptacle to the air duct, said lubricant duct having a plurality of enlargements, and fibrous material in the enlargements and acting as retarding means for the flow of lubricant, said enlargements opening through the face of the block toward the body of the pneumatic drill, said enlargements extending transversely of the lubricant duct to both sides thereof and of greater cross sectional areas than the lubricant duct.

10. A pneumatic drill provided with a lubricant holder, with an air valve intermediate of its length, and a port or air passage leading from the valve to the interior of the drill, the lubricant holder having lubricant receptacles on opposite sides of the air valves, ducts leading from the lubricant receptacles into the passage leading from the air valve to the interior of the drill, said ducts discharging lubricant into said passage in a direction transverse of the direction of travel of the operating air.

11. A pneumatic drill provided with a lubricator having means for holding lubricant, a duct leading from the lubricant holder into the path of air entering the pneumatic drill, and retarding means for the flow of lubricant through said duct, said means consisting of a chamber or well containing fibrous material and having a greater cross-sectional area than the duct, said chamber or well being arranged intermediate of the ends of the duct.

In testimony that I claim the foregoing as my own and have hereto affixed my signature in the presence of two witnesses.

THOMAS TURNER.

Witnesses:
 GEORGE W. ADAMS,
 F. M. ROGERS.